United States Patent
Sato

(10) Patent No.: US 7,497,235 B2
(45) Date of Patent: Mar. 3, 2009

(54) RESIN TUBE FOR FUEL PIPING

(75) Inventor: Masatomi Sato, Koga (JP)

(73) Assignee: Sanoh Kogyo Kabushiki Kaisha, Ibaraki-Ken (JP)

( * ) Notice: Subject to any disclaimer, the term of this patent is extended or adjusted under 35 U.S.C. 154(b) by 313 days.

(21) Appl. No.: 10/560,215

(22) PCT Filed: Mar. 7, 2005

(86) PCT No.: PCT/JP2005/003883

§ 371 (c)(1),
(2), (4) Date: Dec. 9, 2005

(87) PCT Pub. No.: WO2005/090847

PCT Pub. Date: Sep. 29, 2005

(65) Prior Publication Data

US 2006/0174961 A1 Aug. 10, 2006

(30) Foreign Application Priority Data

Mar. 19, 2004 (JP) ............................. 2004-080323

(51) Int. Cl.
*F16L 11/00* (2006.01)
(52) U.S. Cl. ..................... 138/137; 138/140; 138/141; 138/145
(58) Field of Classification Search ............... 138/137, 138/140, 141, DIG. 1; 428/36.91
See application file for complete search history.

(56) References Cited

U.S. PATENT DOCUMENTS

| 5,671,780 | A  | * | 9/1997 | Kertesz ..................... 138/127 |
| 5,937,911 | A  | * | 8/1999 | Kodama et al. ............. 138/137 |
| 6,742,545 | B2 | * | 6/2004 | Fisher et al. ................ 138/137 |
| 2002/0112770 | A1 | * | 8/2002 | Fisher et al. ................ 138/137 |

FOREIGN PATENT DOCUMENTS

| JP | 57-16697 | 1/1982 |
| JP | 4-336245 | 11/1992 |
| JP | 9-222185 | 8/1997 |
| JP | 11-246757 | 9/1999 |
| JP | 3063316 | 10/1999 |

OTHER PUBLICATIONS

Partial English Translation of JP 3063316 dated Oct. 29, 1999.
Patent Abstracts of Japan of JP 4-336245 dated Nov. 24, 1992.
Patent Abstracts of Japan of JP 9-222185 dated Aug. 26, 1997.
Patent Abstracts of Japan of JP 11-246757 dated Sep. 14, 1999.
Partial English Translation of JP 57-16697 dated Jan. 28, 1982.

* cited by examiner

*Primary Examiner*—Patrick F Brinson
(74) *Attorney, Agent, or Firm*—Ladas & Parry LLP

(57) ABSTRACT

A resin fuel pipe has component layers made of thermoplastic resins and high heat resistance sufficient to withstand a hot environment in, for example, an engine compartment. The resin fuel pipe includes a pipe body 10 made of a thermoplastic resin, a first heat-resistant, protective resin layer 12 made of a foam thermoplastic elastomer and coating the pipe body 10 and a second heat-resistant, protective resin layer 14 made of a fire-retardant thermoplastic elastomer and coating the first heat-resistant, protective resin layer 12.

9 Claims, 1 Drawing Sheet

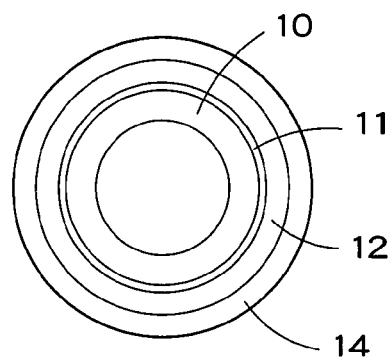
F I G. 1
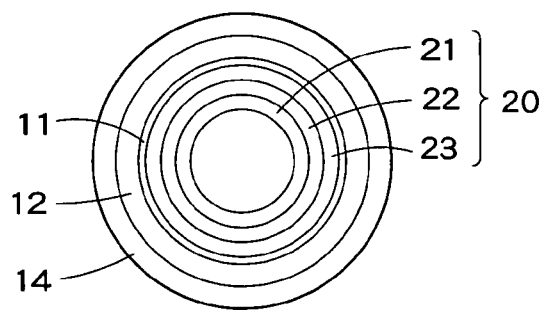
F I G. 2
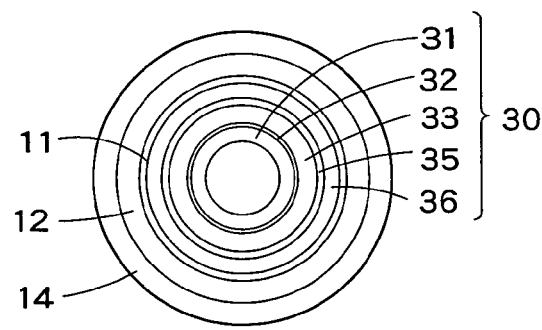
F I G. 3
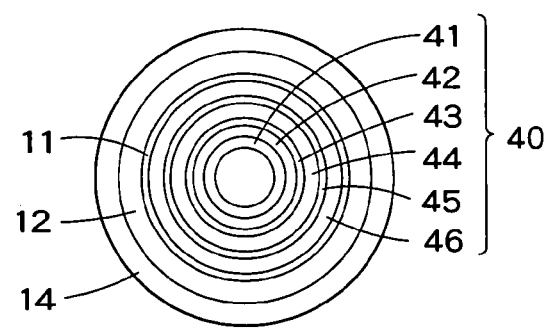
F I G. 4

# RESIN TUBE FOR FUEL PIPING

TECHNICAL FIELD

The present invention relates to a resin fuel pipe to be used as a fuel line on an automobile and, more particularly, to a resin fuel pipe made of a resin and having improved heat resistance.

BACKGROUND ART

Metal fuel pipes have been used on automobiles. Metal fuel pipes as fuel lines are plated or coated with a multilayer resin coating to improve the corrosion resistance and chemical resistance of the metal fuel pipes.

Recently, resin fuel pipes have been used as well as metal fuel pipes as fuel lines. Resin fuel pipes have many advantages over metal fuel pipes. Resin fuel pipes are not rusted, can be easily processed, are lightweight and increase the degree of freedom of design. Usually, resin fuel pipes are made of thermoplastic resins. Resin fuel pipes made of a polyamide resin (PA resin) are used most prevalently.

Resin fuel pipes made of a thermoplastic resin are inferior to metal fuel pipes in heat resistance. Therefore, it is usual to avoid using resin fuel pipes in a hot environment around the engine and to use resin fuel pipes as fuel lines connected to the fuel tank. Metal fuel pipes are used in the engine compartment.

Recently, need for using resin fuel pipes in the engine compartment has progressively increased and heat-resistant resin fuel pipes having improved heat resistance have been developed. Some heat-resistant resin fuel pipes have a part provided with a protector made of EPDM capable of protecting the resin fuel pipe from heat and some other heat-resistant resin fuel pipes are coated with a thermoplastic elastomer (hereinafter, abbreviated to "TPE"), such as a fire-retardant thermoplastic resin.

Although the protector made of EPDM is indubitably highly heat-resistant because EPDM is a thermosetting resin, it is difficult to put the protector made of EPDM on the resin fuel pipe because EPDM is rubber and hence has difficulty in smoothly sliding on the resin fuel pipe. Therefore, to put the protector on the resin fuel pipe, the protector must be formed so that an air layer is formed between the protector and the resin fuel pipe and the surface of the resin fuel pipe needs to be lubricated with a lubricant, such as silicone oil. Thus the use of the protector requires troublesome processes.

The resin fuel pipe coated with the fire-retardant resin, namely, a TPE, can be easily formed by coextrusion molding because the resin fuel pipe and the coating are made of thermoplastic resins, respectively. However, the fire-retardant TPE has a limited heat-resistant ability and the resin fuel pipe coated with a TPE is not suitable for use in a hot environment, such as an environment in an engine compartment in which the resin fuel pipe is exposed directly to heat.

DISCLOSURE OF THE INVENTION

Accordingly, it is an object of the present invention to provide a resin fuel capable of solving the foregoing problems, made of a thermoplastic resin and having a sufficient heat-resistant ability capable of withstanding heat to which the resin fuel pipe will be exposed in a high-temperature environment, such as an environment in an engine compartment.

The present invention provides a resin fuel pipe of multilayer construction including: a pipe body made of a thermoplastic resin; a first heat-resistant, protective resin layer made of a foam TPE and coating the pipe body; and a second heat-resistant, protective resin layer made of a fire-retardant TPE and coating the first heat-resistant, protective resin layer.

In the resin fuel pipe according to the present invention, it is preferable that the pipe body and the first heat-resistant, protective layer are bonded together with an adhesive layer of a thickness of 0.5 m or below.

In the resin fuel pipe according to the present invention, it is preferable that the first heat-resistant, protective resin layer has a thickness of 3.0 mm or below and the second heat-resistant, protective resin layer has a thickness of 5.0 mm or below.

In the resin fuel pipe according to the present invention, the pipe body is a single-wall pipe of a polyamide resin or a multiple-wall pipe including at least one polyamide resin wall and at least one barrier layer of a resin having low permeability.

Although the component layers of the resin fuel pipe of the present invention are made of thermoplastic resins, the resin fuel pipe has a heat-resistant ability sufficient to withstand a high-temperature environment, such as an environment in an engine compartment.

BRIEF DESCRIPTION OF THE DRAWINGS

FIG. 1 is a cross-sectional view of a resin fuel pipe in a first embodiment according to the present invention;

FIG. 2 is a cross-sectional view of a resin fuel pipe in a second embodiment according to the present invention;

FIG. 3 is a cross-sectional view of a resin fuel pipe in a third embodiment according to the present invention; and FIG. 4 is a cross-sectional view of a resin fuel pipe in a fourth embodiment according to the present invention.

BEST MODE FOR CARRYING OUT THE INVENTION

Resin fuel pipes in preferred embodiments according to the present invention will be described with reference to the accompanying drawings.

First Embodiment

Referring to FIG. 1 showing a resin fuel pipe in a first embodiment according to the present invention in a cross-sectional view, the resin fuel pipe in the first embodiment has a single-wall pipe body 10 made of a polyamide resin. The pipe body 10 can be used alone as a fuel pipe in an environment where heat resistance is not very important.

A first heat-resistant protective layer 12 of a resin is put on and bonded with an adhesive layer 11 of an adhesive resin to the pipe body 10. The first heat-resistant protective layer 12 is coated with a second heat-resistant protective layer 14. The first heat-resistant protective layer 12 and the second heat-resistant protective layer 14 form a multilayer structure for protecting the pipe body 10 from heat. The pipe body 10 is coated along the entire length with the first heat-resistant protective layer 12 and the second heat-resistant protective layer 14.

The first heat-resistant protective layer 12 and the second heat-resistant protective layer 14 are made of different TPEs, respectively. The first heat-resistant protective layer 12 is made of a foam TPE and the second heat-resistant protective layer 14 is made of a fie-retardant TPE.

When the resin fuel pipe is intended for use in the engine compartment of an automobile, it is preferable that the first heat-resistant protective layer 12 has a thickness of 3.0 mm or below, the second heat-resistant protective layer 14 has a thickness of 5.0 mm or below and the adhesive layer has a thickness of 0.5 mm or below. The adhesive layer 11 is not an essential component. The pipe body 10 may be coated directly with the first heat-resistant protective layer 12.

When the resin fuel pipe in the first embodiment is extended in the engine compartment, the second heat-resistant protective layer 14 is exposed to heat generated by the engine. The second heat-resistant protective layer 14 made of the foam TPE prevents the ignition of the first heat-resistant protective layer 12 made of the foam TPE and underlying the second heat-resistant protective layer 14. The first heat-resistant protective layer 12 having numerous bubbles scattered therein exhibits a heat insulating effect to insulate the pipe body 10 from heat. Thus the first heat-resistant protective layer 12 suppresses the thermal deterioration of the pipe body 10 made of the polyamide resin comparatively susceptible to heat. Thus, the resin fuel pipe has an extended life even if the same is used in a hot environment.

Both the first heat-resistant protective layer 12 and the second heat-resistant protective layer 14 are made of thermoplastic resins and the intrinsic heat-resistance of the individual first heat-resistant protective layer 12 and second heat-resistant protective layer 14 are not necessarily very high. However, when the first heat-resistant protective layer 12 made of the foam TPE and the second heat-resistant protective layer 14 made of the fire-retardant TPE are used in combination, the different abilities of the first heat-resistant protective layer 12 and second heat-resistant protective layer 14 complement each other to provide a satisfactory effect on protecting the pipe body 10 from heat. Thus the synergistic heat-resistant effect of the first heat-resistant protective layer 12 and second heat-resistant protective layer 14 is higher than the simple additive heat-resistant effect of the first heat-resistant protective layer 12 and second heat-resistant protective layer 14. Consequently, the resin fuel pipe has heat resistance sufficient to withstand the hot environment in the engine compartment.

Since all the components of the resin fuel pipe are made of thermoplastic resins, the resin fuel pipe can be efficiently manufactured by coextrusion molding at a low manufacturing cost.

The foam TPE forming the first heat-resistant protective layer 12 may be a fire-retardant foam PET.

Second Embodiment

Referring to FIG. 2 showing a resin fuel pipe in a second embodiment according to the present invention in a cross-sectional view, the resin fuel pipe in the second embodiment has a three-wall pipe body 20, a first heat-resistant protective layer 12 is put on and bonded with an adhesive layer 11 to the pipe body 20. The first heat-resistant protective layer 12 is coated with a second heat-resistant protective layer 14. The resin fuel pipe in the second embodiment is similar in construction to the resin fuel pipe in the first embodiment.

The pipe body 20 has a first layer 21, namely, an innermost layer serving as a barrier layer, made of a thermoplastic resin having low permeability, such as a PPS, a LCP or an EvOH, a second layer 22, namely, an adhesive layer, covering the first layer 21 and a third layer 23 made of a polyamide resin and bonded to the first layer 21 with the adhesive second layer 22.

The resin fuel pipe in the second embodiment has high heat resistance like the resin fuel pipe in the first embodiment. The first layer 21 serving as a barrier layer of the pipe body 20 has low permeability.

Third Embodiment

Referring to FIG. 3 showing a resin fuel pipe in a third embodiment according to the present invention in a cross-sectional view, the resin fuel pipe in the third embodiment has a five-wall pipe body 30, a first heat-resistant protective layer 12 is put on and bonded with an adhesive layer 11 to the pipe body 30. The first heat-resistant protective layer 12 is coated with a second heat-resistant protective layer 14. The pipe body 30 has five layers including two barrier layers having low permeability. The resin fuel pipe in the third embodiment is similar in construction to the resin fuel pipe in the first embodiment.

The pipe body 30 has a first layer 31, namely, an innermost layer serving as a barrier layer, made of a thermoplastic resin having low permeability, such as a PPS, a LCP or an EvOH, a second layer 32, namely, an adhesive layer, covering the first layer 31, a third layer 33 made of a polyamide resin and bonded to the first layer 31 with the adhesive second layer 32, a fourth layer 34, namely, an adhesive layer, covering the third layer 33, and a fifth layer 35, namely, a barrier layer, bonded to the third layer 33 with the adhesive fourth layer 34. When the first layer 31 serving as a barrier layer is made of a PPS, the PPS may contain carbon fibers to make the first layer 31 electrically conductive and capable of eliminating static electricity.

The resin fuel pipe in the third embodiment has high heat resistance like the resin fuel pipe in the first embodiment. The pipe body 30 having the first layer 21 and the fifth layer 35 serving as barrier layers has lower permeability than the pipe body 10 of the resin fuel pipe in the first embodiment. When the first layer 31, namely, the barrier layer, is made of, for example an LPC having low permeability to all kinds of fuels and the fifth layer 35, namely, the barrier layer, is made of, for example, an EvOH having lower permeability to regular gasoline, the synergistic permeation-resisting effect of the first layer 31 and the fifth layer 35 gives the pipe body 30 low permeability to all kinds of fuels.

Fourth Embodiment

Referring to FIG. 4 showing a resin fuel pipe in a fourth embodiment according to the present invention in a cross-sectional view, the resin fuel pipe in the fourth embodiment has a six-wall pipe body 40, a first heat-resistant protective layer 12 is put on and bonded with an adhesive layer 11 to the pipe body 40. The first heat-resistant protective layer 12 is coated with a second heat-resistant protective layer 14. The pipe body 40 has six layers including two barrier layers having low permeability and two polyamide resin layers. The resin fuel pipe in the fourth embodiment is similar in construction to the resin fuel pipe in the first embodiment.

The pipe body 40 has a first layer 41 made of a thermoplastic resin having low permeability, such as a PPS, a LCP or an EVOH, and serving as a barrier layer, a second layer 42 made of a polyamide resin and covering the first layer 41, a third layer 43 serving as an adhesive layer, a fourth layer 44 serving as a barrier layer and bonded to the second layer 42 by the third layer 43, a fifth layer 45 serving as an adhesive layer, and a sixth layer 46 made of a polyamide resin and bonded to the fourth layer 44 by the fifth layer 45.

The resin fuel pipe in the fourth embodiment has high heat resistance like the resin fuel pipe in the first embodiment and low permeability to all kinds of fuels like the resin fuel pipe in the third embodiment. The second layer 42 made of the polyamide resin and interposed between the first layer 41 and the fourth layer 44 serving as barrier layers protects the first layer 41 having low shock resistance.

The invention claimed is:

1. A resin fuel pipe of multilayer construction having an improved heat-resistance comprising:
    a pipe body made of a thermoplastic resin;
    a first heat-resistant, protective resin layer made of a foam thermoplastic elastomer and coating the pipe body, the foam thermoplastic elastomer of the first heat-resistant protective resin layer for making a heat transfer rate lower; and
    a second heat-resistant, protective resin layer made of a fire-retardant thermoplastic elastomer and coating the first heat-resistant, protective resin layer,
    wherein the second heat-resistant, protective resin layer is an outermost layer.

2. The resin fuel pipe according to claim 1, wherein the pipe body and the first heat-resistant, protective layer are bonded together with an adhesive layer.

3. The resin fuel pipe according to claim 2, wherein the adhesive layer has a thickness of 0.5 m or below.

4. The resin fuel pipe according to claim 1, wherein the first heat-resistant, protective resin layer has a thickness of 3.0 mm or below.

5. The resin fuel pipe according to claim 4, wherein the first heat-resistant, protective resin layer is made of a fire-retardant foam thermoplastic elastomer.

6. The resin fuel pipe according to claim 1, wherein the second heat-resistant, protective resin layer has a thickness of 5.0 mm or below.

7. The resin fuel pipe according to claim 1, wherein the pipe body is a single-wall pipe of a polyamide resin.

8. The resin fuel pipe according to claim 1, wherein the pipe body is a multiple-wall pipe including at least one polyamide resin wall and at least one barrier layer of a resin having low permeability.

9. The resin fuel pipe according to claim 1, which the resin fuel pipe is used as an automotive fuel pipe.

* * * * *